Sept. 8, 1931.  E. O. LOESER ET AL  1,822,740
MEASURING INSTRUMENT
Filed April 10, 1925    3 Sheets-Sheet 1

Inventors
Edward Oscar Loeser
George B. Gallasch
By [signature]
their Attorney

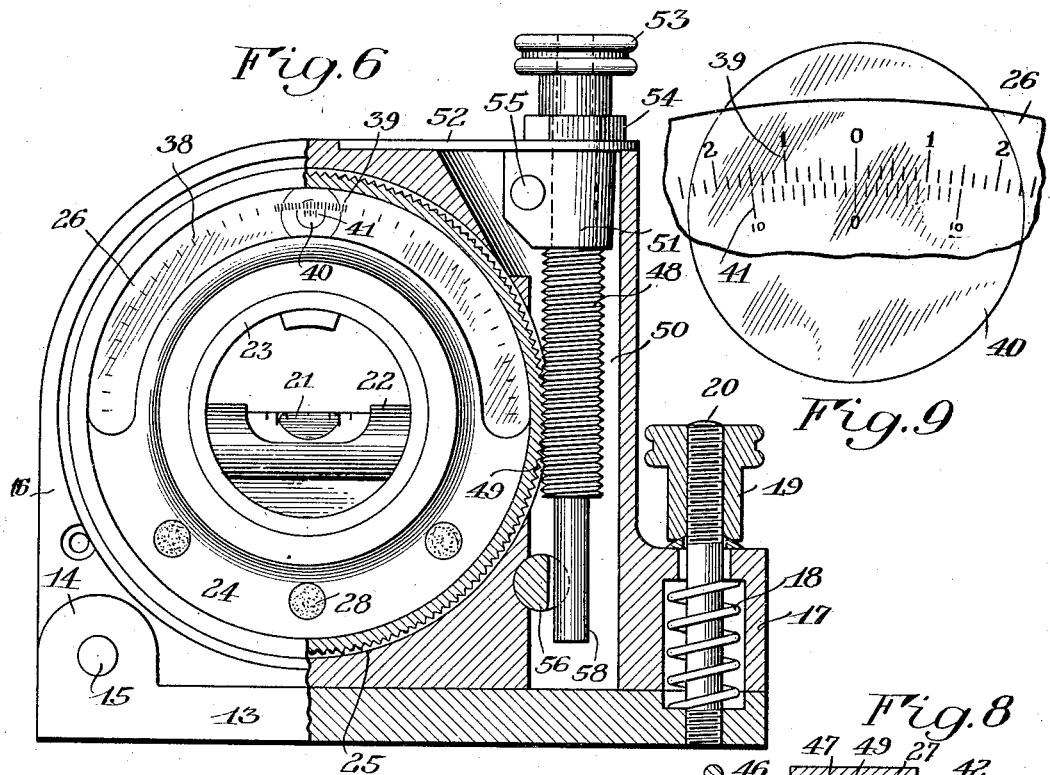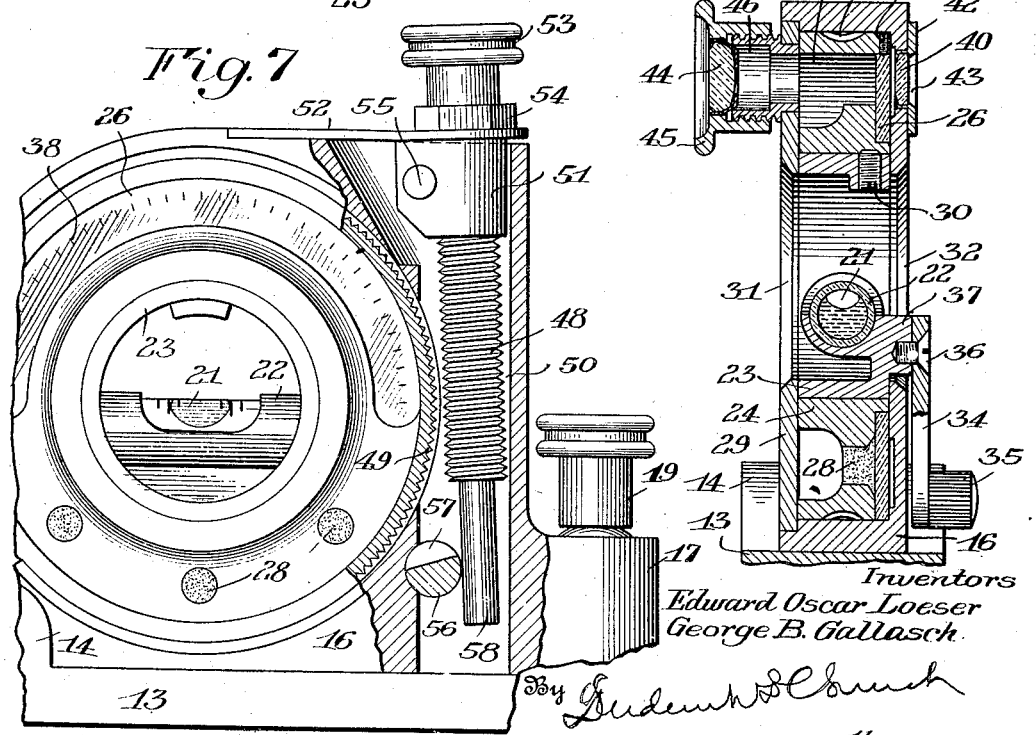

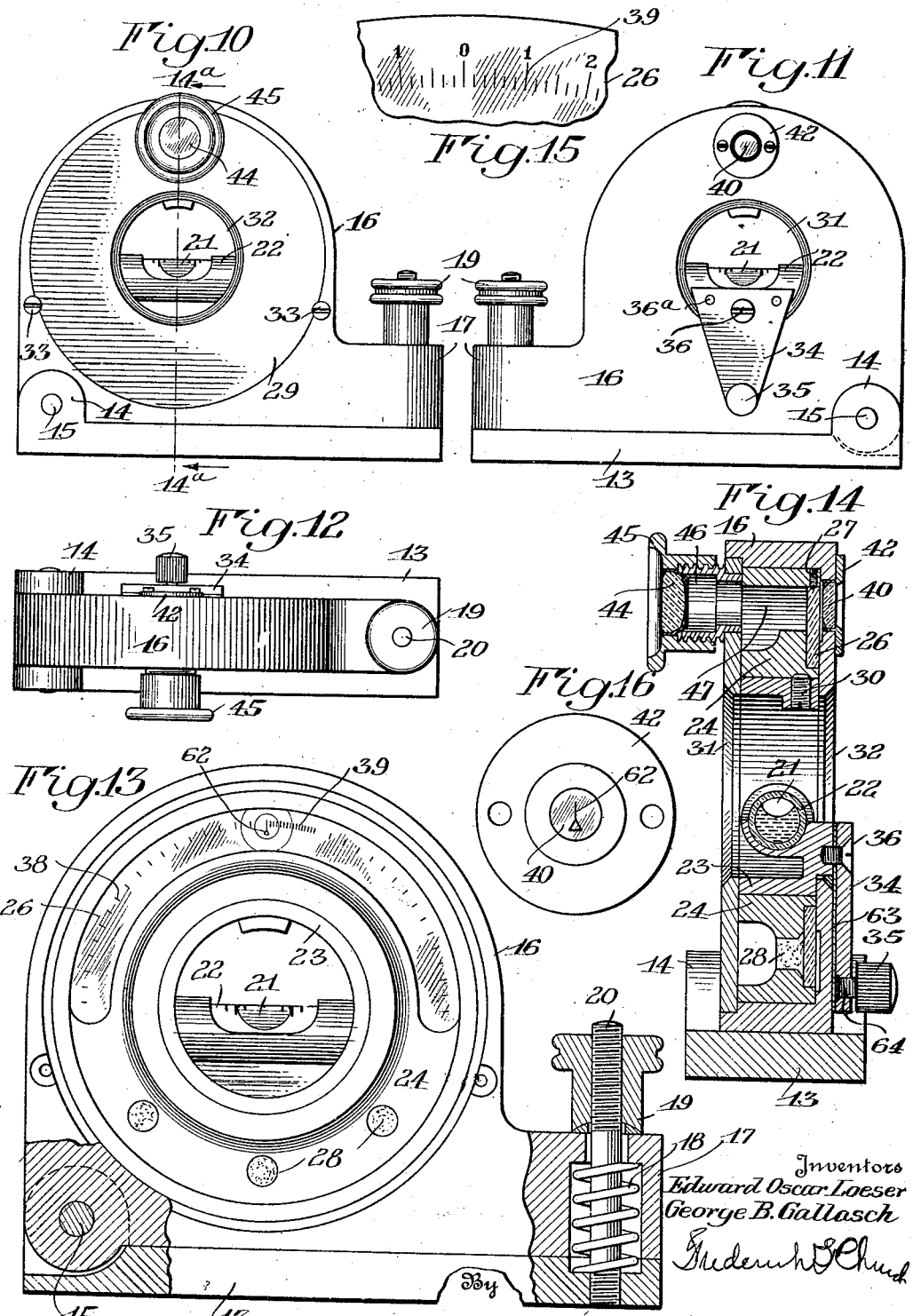

Patented Sept. 8, 1931

1,822,740

UNITED STATES PATENT OFFICE

EDWARD OSCAR LOESER AND GEORGE B. GALLASCH, OF ROCHESTER, NEW YORK, ASSIGNORS TO BAUSCH & LOMB OPTICAL COMPANY, OF ROCHESTER, NEW YORK, A CORPORATION OF NEW YORK

MEASURING INSTRUMENT

Application filed April 10, 1925. Serial No. 22,133.

The present invention relates to measuring instruments, and has for its object to improve instruments of this kind, particularly to provide an instrument adapted for indicating the angular relationship of different members or surfaces and having improvements which render it advantageous as a means for accurately positioning one member or part at a predetermined angle with respect to another.

A further object of the invention is to provide an improved measuring instrument having relatively movable indicating parts including one or more light transmitting elements rendered distinct and particularly advantageous by the admission of light therethrough, whereby the instrument may be accurately read in a darkened room when held between the eye and a window exposed to light or when held between the eye and a concentrated light in a darkened area.

A further object of the invention is to provide an improved measuring instrument embodying enclosed or sealed indicating and operating parts whereby the same are protected against dirt, grease and other substances detrimental to the use of the instrument.

A still further object of the invention is to provide an improved measuring instrument by combining different forms of indicating devices, including one which is gravity actuated or controlled, and so correllating the same that the angular relationship of various parts with respect to the horizontal or vertical may be readily determined at will.

A still further object of the invention is to provide a measuring instrument of the character described herein embodying improved forms of construction and arrangement of parts rendering it compact, durable, convenient to operate and comparatively inexpensive to manufacture.

To these and other ends the invention resides in certain improvements and combinations of parts, all as will be hereinafter more fully described, the novel features being pointed out in the claims at the end of the specification.

In the drawings:—

Figure 6 is a part sectional elevation on an enlarged scale taken on line 6a—6a of Figure 5;

Figure 7 is a somewhat similar view with certain operating parts shown in release position;

Figure 8 is a transverse sectional elevation taken on line 8a—8a of Figure 3;

Figure 9 is an enlarged fragmentary elevation showing the transparent scale or indicating parts of the instrument;

Figure 10 is a side elevation of an instrument illustrating a slightly different form of the invention;

Figure 11 is a view in elevation showing the opposite side of the instrument from that shown in Figure 10;

Figure 12 is a top plan view of the same;

Figure 13 is an enlarged side elevational view partly in section with the front cover plate removed;

Figure 14 is an enlarged transverse sectional elevation taken on line 14a—14a of Figure 10;

Figure 15 is an enlarged fragmentary view illustrating a portion of the revoluble light transmitting scale from which the readings are taken, and Figure 16 is an enlarged detail view in elevation illustrating the stationary light transmitting sight for cooperation with the adjustable scale shown in Figure 15.

Similar reference numerals throughout the several views indicate the same parts.

Figure 1:
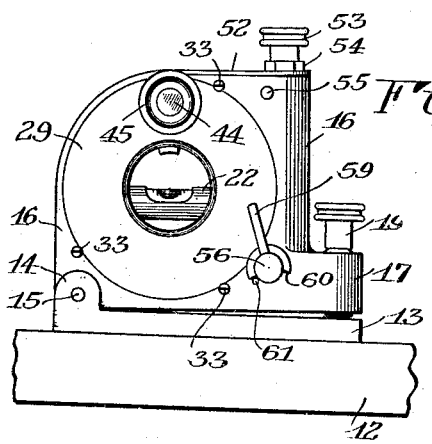
Figure 1 is a side elevation of an instrument embodying one form of the invention shown applied in leveled position upon the bed or frame of a metal working machine.
Figure 2:
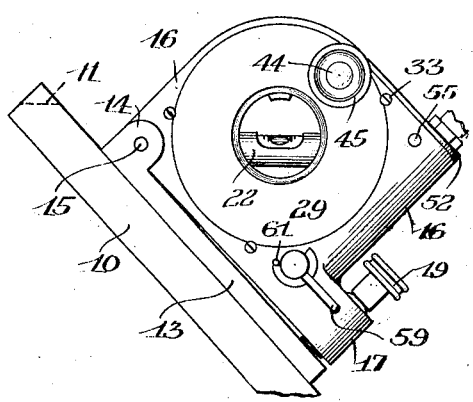
Figure 2 is a similar view with the instrument set for a predetermined angle and disposed upon a work piece to indicate the desired angular position of the latter with respect to the frame.

The present invention embodies a measuring instrument adapted for a wide use both in the measuring of angles to determine the angular relationship between different surfaces and in the positioning of relatively movable parts or members so that they may be brought to the desired relationship with respect to each other. The invention is particularly applicable for use in connection with various metal working machines including tool making machinery but its use is of course not limited to machines or work of this kind since it is readily serviceable in various forms of construction regardless of the nature of the same. In other words, it may be employed in many different arts, either where it is desired to measure unknown angles or to adjust or locate different parts at predetermined angles with respect to each other, or to mount them in parallel relation if desired. A specific example of its use is in the art of metal working where with a milling or other metal cutting machine it is desired to form one or more angular cuts upon a bar 10, as indicated by the dotted line 11 in Figure 2. In this case the instrument is first placed upon the bed or base 12 of the machine as indicated in Figure 1 and accurately brought to level position through the adjustments provided, the revoluble indicating member of the instrument having been previously set at zero position, as shown in Figures 6 and 9, with an equal number of degrees on each side of the zero point. The adjustable indicating member is then set for 45°, or at whatever angle is desired by rotating the same together with suitable gravity actuated means, such as a spirit level which is fixed with respect to the movable indicating member. The instrument is then placed upon the bar 10 which is inserted in suitable holding means on the base 12, not shown, the bar being adjusted angularly with respect to the base until the bubble is in central position as shown in Figure 2, thus indicating that the bar is at the desired angle with respect to the base. It is then clamped or otherwise secured in position by suitable means provided for the purpose, it being understood that the cutting tool is so mounted with respect to the base as to operate upon the bar at the angle previously determined upon.

Figure 3:
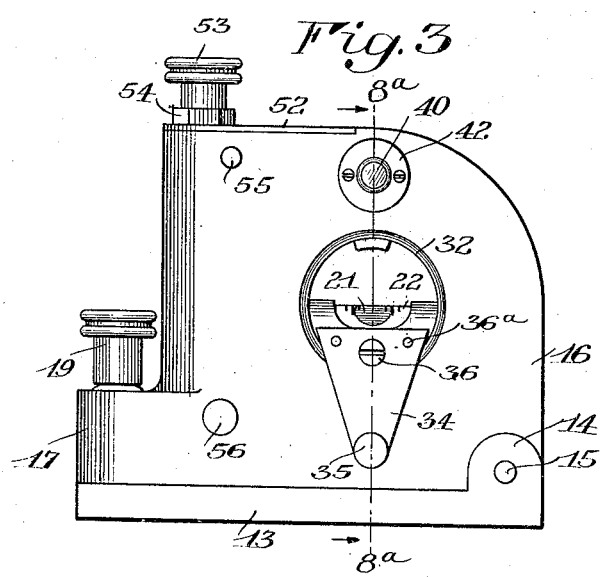
Figure 3 is a side elevation on an enlarged scale showing the opposite side of the instrument from that shown in Figure 1.
Figure 4:
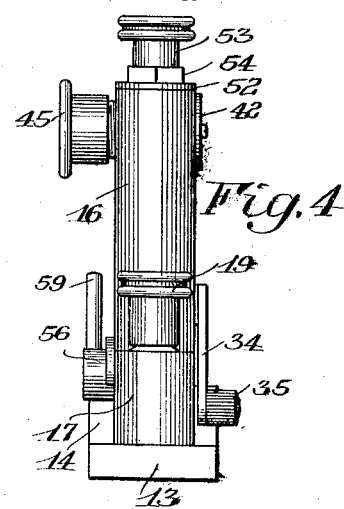
Figure 4 is an end elevation of the instrument shown in Figure 3.
Figure 5:
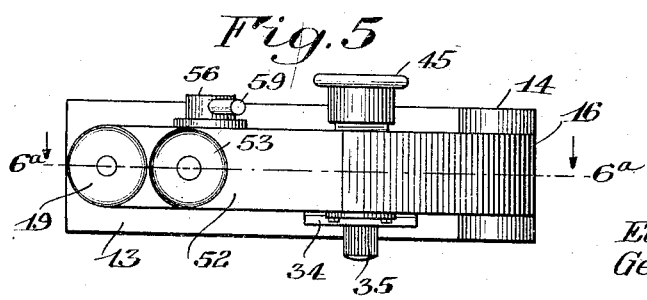
Figure 5 is a top plan view of the same.

The invention as illustrated in the drawings embodies a bracket or base 13 having upstanding lugs 14 carrying a pivot member 15 upon which is adapted to swing a frame or casing 16 having an extension 17 as shown in Figures 1 to 3 inclusive. The extension 17 is recessed to receive a spring 18 which is adapted to move the casing 16 upon its pivot 15 in a direction away from the bracket 13 upon loosening a thumb nut 19 on a screw 20 extended through the spring and having its lower end suitably anchored upon the bracket. Means is thus afforded for leveling the instrument so that the bubble 21 of the spirit level 22 may be brought to the desired position. The spirit level is suitably mounted on a ring-shaped member 23 which is rigidly connected with a revoluble holder 24 preferably in the form of a disk or wheel which is accurately centered within the circular opening 25 of the casing whereby the holder is free to rotate about its axis in either direction. The holder is recessed at one side to receive a light transmitting ring-shaped plate 26 constructed of any suitable material which is firmly secured upon the holder by a plurality of screws 27, one of which is shown in Figure 8. The ring is additionally secured upon the holder by a suitable binding material which is preferably disposed in recessed portions of the holder 24 as indicated at 28. A removable cover plate 29 forms a closure for the casing and preferably affords a bearing for the outer face of the ring 23 and holder 24 as shown in Figure 8, the ring being secured upon the holder by any suitable means, such as the set screw 30. The closure has a central opening 31 corresponding to an opening 32 in the backside of the casing whereby the spirit level is visible from either side of the instrument. The closure is removably held in position by a suitable number of screws 33 as shown in Figures 1 and 2.

Rotation of the holder is effected preferably by means of a crank including an arm 34 and a handle portion 35 thereon, the arm being detachably secured by a screw 36 to a laterally projecting portion 37 of the spirit level holding ring 23, as shown in Figure 8, and being also held by pins 36ª which prevent movement of the arm relative to the member 37.

The light transmitting ring or plate 26 is provided with a suitable scale as indicated generally at 38 in Figures 6 and 7, a more complete disclosure of the same being shown in Figure 9. The scale is graduated to indicate at least 90° on each side of the zero point so that the spirit level may have an adjustment of 180° to accommodate it to any angle desired. The divisions on the scale as shown in Figures 6 and 7, are each equal to 5° except the finer readings shown at 39 in Figure 6 which are one degree spacings. In Figure 9 the one degree spacings are divided into six equal parts, each of which represents ten minutes. The same is true of the instrument shown in Figures 10 to 14, the scale being disclosed in Figures 13 and 15 of this modification.

In the form of the invention shown in Figures 1 to 9 inclusive, means has been provided for obtaining a relatively fine adjustment by which the reading may be taken in minutes. This is afforded by providing an additional scale on a fixed light transmitting element 40, the scale thereon being indicated at 41 in Figure 9, the same being visible through the rotatable scale member 26. The scale 41 is divided into ten spacings on each side of the zero mark, the total of the ten spacings corresponding to 9 of the 10° spacings on the scale plate 26, thus permitting readings to be taken in minutes as will be readily understood. The light transmitting element 40, having the scale 41, is secured within a suitable holder 42 which has an opening 43 for the admission of light to both of the scale members 26 and 40. It will be understood that the scale or indicating means shown may be modified as desired, both as regards the kind of material used, the form of construction employed and the markings from which the readings are taken. It is preferred however that the parts containing the markings be made of a suitable light transmitting material, so as to facilitate reading by the admission of light therethrough. This, as pointed out above, is advantageous since in the use of the instrument in a darkened or poorly lighted room it is not necessary to take it to a window to be read or to provide a light by which it may be viewed, it being sufficient merely to hold the instrument between the eye and a window or a light that may be more or less distant from the point of observation.

The instrument may be made in different sizes, but is preferably made comparatively small and compact. The markings on the scale plates are, therefore, relatively fine and for this reason a magnifying lens or glass is provided as indicated at 44 through which the indicating means may be easily read. The lens 44 is suitably secured in a tubular holder 45 which is adapted for adjustment toward and from the scale plate 26 to provide for the proper focusing of the lens. The adjustment is effected preferably by threading the holder upon a tubular member 46 secured to the closure member 29 centrally of an arcuate opening 47 in the rotatable holder 24 when the latter is at zero position whereby the scale plate may be viewed during rotation through an angle of 180° or from one extreme position to another. If desired, the holder may be rotated in either direction to the extent of a complete revolution by positioning the arm 34 so as to clear the scale holder 42 or by varying the position of the latter to afford the necessary clearance. Furthermore, the opening 47 of the holder may be extended to include all or substantially all of the circle if desired and the scale on the plate 26 likewise extended to complete the circle.

The parts thus far described are substantially the same for both forms of the invention, and corresponding reference characters have therefore been used to designate such parts, the description above being intended to cover both forms.

Additional means has been provided for rotating the holder 24 in order to obtain a relatively fine adjustment of the indicating means as above stated. This means includes an operating screw 48, preferably having relatively fine threads which are normally disengaged from the threads 49 of the holder shown in Figures 6 and 7. The threads 49 are preferably formed centrally of the holder 24 as shown in Figure 8, so as to leave a peripheral bearing portion upon the holder at the opposite edges thereof, the holder being projected slightly into the recess 50 within which the screw is mounted. The upper end of the operating screw is rotatably disposed in a block 51 on the underside of a yieldable plate 52 supported by the upper face of the casing 16 as shown in Figures 6 and 7. The screw 48 is provided with a head 53 rigid thereon and by which it is operated, the head having a bearing on a nut 54 rigidly secured upon the plate 52 in any desired manner. The block 51 is pivotally supported upon the casing preferably by a pin 55 extending therethrough with its ends projecting into and supported by the side walls of the casing. The purpose of pivoting the operating screw as shown is to permit it to be moved into and out of operative engagement with the teeth of the holder as disclosed in Figures 6 and 7, the latter position permitting free rotation of the holder by the use of the crank arm 34 to bring the indicating means approximately to the position desired while the operating screw serves to obtain a relatively fine or accurate adjustment of the indicating means. Means for moving the screw out of engagement with the teeth of the holder preferably comprises a rotatable pin or bolt 56 slotted at 57 to receive an extension 58 on the screw, the portion of the bolt opposite the extension being in the form of a cam adapted when moved to the position shown in Figure 7 to rock the screw outwardly upon its pivot 55 against the action of the yieldable plate 52, the latter being adapted to return the screw into operative relation with the holder when the bolt is moved to the position shown in Figure 6. The bolt is held against lateral displacement by the extension 58 when the latter is within the slot by reason of its engagement with the end walls of the slot. Rotation of the bolt is effected by a handle 59 on one end thereof. The extent of rotation or angular adjustment of the bolt 56 is preferably limited by the engagement of shoulder portions 60 on the head of the bolt with a stop pin 61 projecting from the wall of the casing as shown in Figures 1 and 2. When the handle 59 is in the position shown in Figure 1, the operating screw is thrown out of engagement with the holder so that the latter can be freely turned approximately to the position desired, the screw being rendered inoperative in release position. The handle is then moved to the position shown in Figure 2 to allow the screw to be returned by the spring plate 52 to the position shown in Figure 6 in which it will operate when rotated to afford a relatively fine adjustment of the movable indicating member. However, in this position it will lock the holder against rotation by the crank arm 34.

In the form of invention shown in Figures 10 to 16 inclusive the light transmitting plate 40 instead of having a short scale as indicated at 41 in Figure 9 is provided with a suitable mark 62 with which the zero point of the scale 38 is adapted to register when the holder is in central position as shown in Figure 13, said mark being adapted to cooperate with the scale to indicate the angle through which the spirit level is moved.

The scale holder 24 and parts carried thereby in the form of the invention shown in Figures 10 to 16 may be locked in any desired position of adjustment by a yieldable friction plate 63 disposed between the crank arm 34 and the rear wall of the casing 16 as shown in Figure 14, the same being forced into frictional engagement with the casing by means of a screw 64 threaded in the crank arm 34 and operated by the handle 35, the plate 62 being clamped upon the casing by tightening the screw as will be readily understood.

The instrument above described is one in which the revoluble scale and holder therefor are sealed within the casing so that they are protected at all times and under all conditions of operation from dirt, grease and other foreign substances which are detrimental to the use of measuring instruments of this kind. The present instrument is therefore one which can be depended upon for satisfactory service under adverse conditions of use and one which is extremely simple and convenient to operate and particularly useful under poor lighting conditions, as pointed out above. It is also an instrument which may be used in many different lines of work either for obtaining unknown angles or for locating various parts at predetermined angles with respect to each other. For example, if it is desired to determine whether or not a wall or any surface is in a true perpendicular plane, the base of the instrument can be placed in a vertical position thereon and the spirit level moved to a horizontal position until the bubble is in the center of the glass. If the surface is absolutely perpendicular, then the scale will indicate an angle of 90°, but if the surface is not perpendicular the extent of its variation will be apparent by the difference between the angle indicated by the scale and that of the 90° angle.

We claim as our invention:

1. In a measuring instrument, the combination of a base, a casing pivoted to swing thereon, means for adjusting the casing upon the base, a spirit level adjustable to different angles within the casing, indicating means within the casing spaced from and movable with the spirit level for determining the angular position of the latter, an eye piece upon the casing for viewing the indicating means, and a window opposite the eye piece having an indicating mark thereon for cooperation with said indicating means, said eye piece and window being on opposite sides of the spirit level and both said scale and indicating mark being visible through the eye piece.

2. In a measuring instrument, the combination of a frame, a holder rotatably mounted thereon, a spirit level carried by the holder, means for indicating the extent of adjustment of the holder, separate manually adjustable operating devices for rotating the holder and means for rendering one of the operating devices ineffective during operation of the other.

3. In a measuring instrument, the combination of a frame, a holder rotatably mounted thereon, a spirit level carried by the holder, means for indicating the extent of adjustment of the holder, separate operating devices for rotating the holder, one of which is adapted to swing relative thereto and means for moving the last mentioned operating device to inoperative position.

4. In a measuring instrument, the combination of a frame, a holder rotatably mounted thereon, a spirit level carried by the holder, cooperating indicating means upon the frame and holder for indicating the angle of rotation of the spirit level, and separate operating devices for the holder, one of which is adapted to prevent operation of the holder when in a predetermined position with respect thereto.

5. In a measuring instrument, the combination of a casing, a holder rotatably connected with the casing, a spirit level carried by the holder, indicating means comprising relatively movable transparent scale and index elements for indicating the angle of rotation of the spirit level, one of which is adapted to be actuated by the holder within the casing, and a magnifying lens upon the casing for viewing said elements.

6. In a measuring instrument, the combination of a casing having a sight opening in its wall, a holder adjustably mounted within the casing, a spirit level carried by the holder and means for indicating the angle of adjustment of the spirit level upon the casing comprising relatively movable parts, formed of light transmitting material adapted to be illuminated by light admitted through said opening a second opening in the wall of the casing whereby said parts are rendered visible and one of which serves to close said second opening.

7. In a measuring instrument, the combination of a casing having an opening through its wall, a light transmitting element forming a closure for said opening, a holder adjustably connected with the casing, a spirit level carried by the holder and movable to different angular positions upon the casing, and a second light transmitting element forming a scale adapted to cooperate with a mark on the first mentioned light transmitting element for indicating the extent of movement of the spirit level.

8. A measuring instrument for determining the angular relationship of a member relative to a horizontal plane, comprising a casing adapted to be disposed upon said member, angle measuring means including an adjustable light transmitting element within the casing adapted to be illuminated by light admitted through an opening in the wall thereof and also including a separate light transmitting element closing another opening in the wall of the casing and means for indicating when the holder is in a predetermined position of adjustment.

9. A measuring instrument for determining the angular relationship of a member relative to the horizontal plane, comprising a casing adapted to be positioned upon said member and having a sight opening therein, a holder rotatably connected with the casing, a spirit level upon the holder and cooperating light transmitting parts arranged to be viewed through the opening, one of which parts is carried by the holder for rotation thereby within the casing and another carried by the casing, said parts having markings by which to determine the angular position of the spirit level, said markings being visible through the sight opening.

10. In a measuring instrument for determining the angular relationship of a surface relative to a horizontal plane, comprising a frame adapted to be positioned upon said surface and having a sight opening therein, a holder adjustable upon said frame, indicating devices carried by said holder including a gravity actuated medium and a light transmitting scale holding element both of which move with the holder, and a second light transmitting element located on the frame opposite said scale holding element for admitting light to the latter, said second element having a mark thereon cooperating with the scale on said first mentioned element when it is moved by the holder for indicating the angle required, said mark and scale being visible through the sight opening.

11. In a measuring instrument, the combination of a base, a casing mounted to swing upon the base, a holder adjustable within the casing, a spirit level carried by the holder, means for adjusting the casing upon the base to effect adjustment of the spirit level, independent means for adjusting the holder within the casing comprising a pivoted screw arranged to swing to and from operating position with respect to the holder, means for swinging the screw to release position and cooperating scale and index parts for indicating the extent of adjustment of the holder, one of said parts being carried by the casing and the other by the holder within the casing.

12. A measuring instrument of the class described comprising a frame having a base portion, a rotary holder on the frame having an opening therethrough for the passage of light, a light transmitting element disposed upon the holder in registry with said opening, a second light transmitting element on the frame opposite said first mentioned element, said elements having markings cooperating to indicate the extent of rotation of the holder upon the frame, and gravity controlled means for indicating when the holder is adjusted to a predetermined position upon the frame.

13. A measuring instrument of the class described comprising a frame having a base portion, a rotary holder on the frame having an opening therethrough for the passage of light, a light transmitting element disposed upon the holder in registry with said opening, a second light transmitting element on the frame opposite said first mentioned element, said elements having markings cooperating to indicate the extent of rotation of the holder upon the frame, an eye-piece on the frame including a magnifying lens positioned for viewing through said opening the markings on said light transmitting elements, a spirit level on the holder for indicating when the latter is adjusted to a predetermined position upon the frame and means for rotating the holder upon the frame.

14. In a measuring instrument, the combination of a casing including front and rear side walls and a base, a rotary holder within the casing having an opening therein, a light transmitting element carried by the holder within the casing in registry with said opening, said rear wall having an opening opposite said element, a second light transmitting element carried by the rear wall for admitting light through the opening thereof, one of said elements having a scale thereon and the other an index for cooperation therewith, said front wall having a sight opening opposite said light transmitting elements and gravity controlled means for indicating when the holder is rotated to a predetermined position of adjustment.

15. In a measuring instrument, the combination of a casing, a rotary holder having a portion enclosed within the casing, a light transmitting plate carried by said portion for rotation within the casing and having a scale thereon, the opposite walls of the casing having openings in registry with said plate, one comprising a sight opening and the other an opening for admitting light to said plate, a light transmitting element closing the last mentioned opening and having an index for cooperation with said scale and gravity controlled means for indicating when the holder is moved to predetermined positions of adjustment.

16. In a measuring instrument, the combination of a casing, a rotary holder having a portion enclosed within the casing, a light transmitting plate carried by said portion for rotation within the casing and having a scale thereon, the opposite walls of the casing having openings in registry with said plate, one comprising a sight opening and the other an opening for admitting light to said plate, a light transmitting element closing the last mentioned opening and having an index for cooperation with said scale, a spirit level carried by the holder for indicating when the latter is in a predetermined position of adjustment, and an operating device for the holder adjustable into and out of engagement therewith.

17. In a measuring instrument, the combination of a casing, a holder rotatable within the casing, light transmitting scale and index members, one of which is carried by the casing and the other by the holder therein, an adjustable eye-piece on the casing through which the readings are rendered visible, and gravity controlled means for indicating when the holder is in a predetermined position of adjustment.

18. In a measuring instrument, the combination of a casing, a holder rotatable within the casing, light transmitting scale and index members, one of which is carried by the casing and the other by the holder therein, said casing having a sight opening through which to view said scale and index members, a magnifying lens closing said opening, and a spirit level carried by said holder for indicating when the latter is in a predetermined position of adjustment.

19. In a measuring instrument, the combination of a frame including oppositely disposed walls having an annular recess therebetween, a rotary holder carried by the frame including a portion projecting within said recess, cooperating scale and index elements formed of light transmitting material, one of which is carried by a portion of the holder projecting within said recess and the other closing an opening in one of said walls and adapted to admit light to the other of said elements, a third light transmitting element closing an opening in the wall opposite the last mentioned wall and through which said scale and index elements are rendered visible, and gravity controlled means carried by the holder for indicating when the latter is in a predetermined position of adjustment.

20. In a measuring instrument, the combination of a casing, a holder rotatable within the casing, cooperating light transmitting scale and index members, one of which is carried by the holder and the other by the casing, a magnifying lens on the casing through which the readings are viewed, a spirit level carried by the holder for indicating when the latter is in a predetermined position of adjustment, and an operating device for the holder adjustable to and from operating position.

21. A measuring instrument of the class described comprising a frame having a light admitting opening, an adjustable light transmitting element carried by the frame, a second light transmitting element on the frame arranged to admit light through the opening to said first mentioned element to illuminate the same, said elements having cooperating scale and index markings, lens means on the frame for viewing the markings of both elements when illuminated and indicating means associated with said adjustable element for indicating when its is in a predetermined position of adjustment.

22. A measuring instrument of the class described comprising a frame, a rotary light transmitting element carried by the frame, said frame having a sight opening and a light transmitting opening on opposite sides of said element, a light transmitting element in registry with said last mentioned opening for admitting light to illuminate said rotary element, said elements having cooperating scale and index markings visible through said sight opening, and means connected with said rotary element for indicating when it is in a predetermined position of adjustment.

23. A measuring instrument of the class described comprising a frame having oppositely spaced wall portions, one having a sight opening and the other having a light admitting opening, a light transmitting element upon the frame in registry with the last mentioned opening and a second light transmitting element adjustable between said wall portions and opposite sight openings, said elements having cooperating scale and index markings arranged to be viewed through said sight opening and to be illuminated by light admitted through said first mentioned element.

EDWARD OSCAR LOESER.
GEORGE B. GALLASCH.